United States Patent [19]
Spencer

[11] 3,967,188
[45] June 29, 1976

[54] TEMPERATURE COMPENSATION CIRCUIT FOR SENSOR OF PHYSICAL VARIABLES SUCH AS TEMPERATURE AND PRESSURE

[75] Inventor: William H. Spencer, Monrovia, Calif.

[73] Assignee: Bell & Howell Company, Chicago, Ill.

[22] Filed: Aug. 14, 1975

[21] Appl. No.: 604,620

Related U.S. Application Data

[63] Continuation of Ser. No. 363,381, May 24, 1973, which is a continuation of Ser. No. 152,199, June 11, 1971.

[52] U.S. Cl. .................. 323/75 B; 73/88.5 R; 73/393; 73/398 R; 323/75 F; 307/310
[51] Int. Cl.² .................. G01L 9/02; G01L 19/04
[58] Field of Search ........... 73/88.5 SD, 393, 398 R, 73/88.5 R; 307/310; 323/75 B, 75 E, 75 F, 75 N; 330/23

[56] References Cited
UNITED STATES PATENTS

| | | | |
|---|---|---|---|
| 3,111,620 | 11/1963 | Baker | 323/75 |
| 3,192,405 | 6/1965 | Patchell | 307/296 |
| 3,461,380 | 8/1969 | McGhee | 323/68 |
| 3,495,159 | 2/1970 | Smith | 323/69 |
| 3,513,430 | 5/1970 | Heller | 338/4 |
| 3,646,815 | 3/1972 | Martin et al. | 73/398 |
| 3,654,545 | 4/1972 | Demark | 323/75 |
| 3,706,047 | 12/1972 | Gunzel | 330/24 |
| 3,831,042 | 8/1974 | LaClaire | 307/310 |

Primary Examiner—Richard C. Queisser
Assistant Examiner—Frederick Shoon
Attorney, Agent, or Firm—Edwin L. Hartz; Richard L. Myers

[57] ABSTRACT

A temperature compensation circuit for sensors of physical variables, such as temperature and pressure, employs an effective constant current source that is sensitive to ambient temperature and which has an adjustable thermal slope and an adjustable output at discrete temperatures. The effective constant current source may be connected across the input terminals of a sensor such as a pressure transducer employing strain gages or it may be connected in series with the excitation current of such a transducer. Additionally, the effective constant current source may be connected in the output of a sensor such as a thermocouple that is responsive to temperature changes. When connected to the input of a sensor, the temperature compensation circuit controls the excitation current through the sensor as a function of the ambient temperature of the sensor and compensation circuit. When connected in the output of the sensor, the temperature compensation circuit provides a voltage that is a function of the ambient temperature, which voltage is added to the output of the sensor to compensate for voltage variations due to changes in ambient temperature.

27 Claims, 4 Drawing Figures

INVENTOR.
WILLIAM H. SPENCER
BY
Christie, Parker & Hale
ATTORNEYS 3,967,188

TEMPERATURE COMPENSATION CIRCUIT FOR SENSOR OF PHYSICAL VARIABLES SUCH AS TEMPERATURE AND PRESSURE

Related Application

This application is a continuation of U.S. Ser. No. 363,381, filed May 24, 1973, which in turn is a continuation of U.S. Ser. No. 152,199, filed June 11, 1971.

BACKGROUND OF THE INVENTION

1. Field of the Invention

This invention relates to a temperature compensation circuit which is particularly useful in compensating for changes in ambient temperature of pressure and temperature sensors. Sensors generally have a thermal response such that operation at a temperature other than that at which the sensor has been calibrated results in an error in the output of the sensor. For example, strain gages are often employed in a pressure sensor where the medium communicating with the gages is a liquid which has a temperature different from that at which the gages and resultant sensor were calibrated. Similarly, thermocouples used in accurately measuring temperature changes may have two junctions of dissimilar metals away from the medium in which the temperature is to be sensed. The temperature in these two junctions may vary independently of the temperature of the medium and may also be different from the temperature at which the thermocouple was calibrated. As a consequence spurious and erroneous electromotive forces or voltages are generated which distort the output of the thermocouple.

2. Description of the Prior Art

Various methods and apparatus have been employed in the past to compensate for the thermal responsiveness of sensors. For example, wire wound resistors employing low temperatures coefficient wire, as close to zero coefficient as possible, have been employed. Additionally, where the gages have a positive or negative temperature coefficient, a wire wound resistor having the opposite temperature coefficient and hopefully the same thermal slope or resistance variation with respect to temperature was connected in series with the gages. However, these wire wound resistors have a tendency to break due to the differences in thermal expansion rates of the resistors and the conformal coating used to hold them in place. Consequently these wire wound resistors tend to be unreliable. Alternatively, thermistors have been employed in compensation circuits but the thermistors exhibit a nonlinear temperature coefficient that is not compatible with the thermal slope of the sensors to be compensated. Moreover the temperature compensation circuits are generally useful with only one specific sensor requiring a specific amount of compensation at a particular temperature which severely limits the usefulness of these compensation circuits.

SUMMARY OF THE INVENTION

The disadvantages of the wire wound resistor and thermistor type compensation circuits are overcome in accordance with this invention. The compensation circuit of this invention is adjustable at specific temperatures to compensate sensors having different characteristics at the specific temperatures. Additionally, the thermal slope of the compensation circuit is adjustable in accordance with this invention. The compensation circuit comprises an effective constant current source or current load that is connectible with the sensor to control the current through the sensor or to generate a compensating voltage to compensate for changes in the sensor output due to variations in the ambient temperature of the sensor. In accordance with this invention, pressure transducers have an output that is pressure related only and temperature sensors have an output related solely to the temperature of the medium being monitored.

In combination with a pressure transducer employing one or more strain gages having a particular temperature coefficient, a controllable current path having a current related to the ambient temperature of the sensor is employed. The current path may advantageously include an active element and present a high impedance across the excitation input of the sensor. Alternatively a controllable current path having an active element and a relatively low impedance may be connected in series with the sensor.

In a temperature sensor employing a thermocouple, the controllable current path is connected to develop a compensating voltage related to the variation in ambient temperature at the junction of the dissimilar materials where the thermocouple is connected in the circuit.

The temperature compensation circuit of this invention may also advantageously be fabricated as a hybrid circuit or with discrete circuit elements. As a hybrid circuit, the compensation circuit will generally require considerably less space than is required by the wire wound resistors of the present compensation circuits.

BRIEF DESCRIPTION OF THE DRAWINGS

These and other features and advantages of the invention may be understood more fully and clearly upon consideration of the following specification and the drawing in which.

DESCRIPTION OF THE PREFERRED EMBODIMENT

Figure 1:
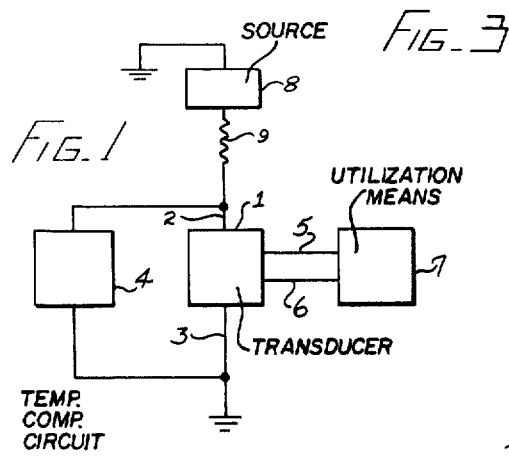
FIG. 1 is a block diagram of a temperature compensated sensor having the temperature compensation circuit of the present invention connected across the input terminals of the sensor.

The temperature compensation circuit of the present invention is useful in compensating for variations in the output of the sensor due to variations in ambient temperature. The variations in the output due to variations in ambient temperature distort the output of the sensor and represent error signals. Compensation of a sensor by connecting the temperature compensation circuit of the present invention across the input of the transducer means of the sensor is shown in FIG. 1. A transducer means 1 has a pair of input terminals 2 and 3 across which a temperature compensation circuit 4 is connected. The transducer means has a pair of output terminals 5 and 6 to which a utilization means 7 is connected. A source of excitation current 8 is connected to the transducer means through a resistor 9. For purposes of illustration, it is assumed that one side of the source is grounded and that one side of the transducer means is grounded.

Figure 3:
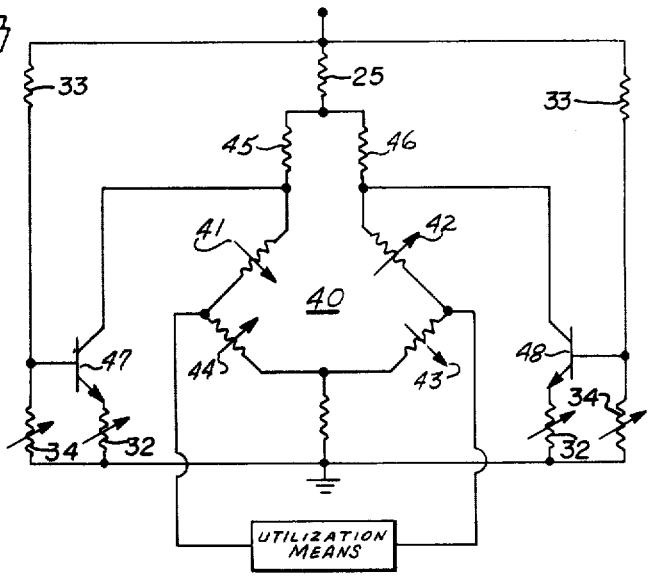
FIG. 3 is a schematic diagram of a pressure sensor having temperature compensation over its full range and providing for zero balance in accordance with the present invention.
Figure 2:
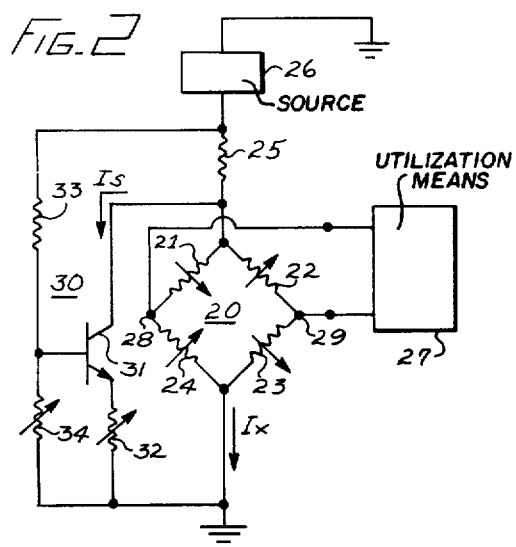
FIG. 2 is a schematic diagram of a pressure sensor having temperature compensation in accordance with this invention.

The use of the temperature compensation circuit of the present invention with a pressure transducer is shown schematically in FIG. 3. A transducer means 20 is illustrated as including four strain gages 21, 22, 23, and 24, connected in a Wheatstone bridge configuration. However, the transducer means 20 may employ a single transducer in place of the four strain gages for sensing the pressure changes of the medium communicating with the transducer.

One input node of the transducer 20 is connected through a resistor 25 to a source of excitation current 26. A utilization means 27 is connected across output nodes 28 and 29 of the transducer 20. In a normal pressure transducer configuration, two of the strain gages will typically be in compression, for example gages 21 and 23, while the other two will be in tension, for example gages 22 and 24. In the newer pressure transducers, the strain gages may be composed of semiconductor material and mounted on a common membrane with the membrane communicating with the medium to be monitored.

In operation, as the pressure on the membrane changes, the change is sensed by the strain gages 21 through 24 and an output voltage is developed across the two opposite nodes 28 and 29 which is transmitted to the utilization means 27. The transducer 20 is calibrated to have a selected output voltage, which may be zero volts, at a particular pressure, which may be atmospheric pressure. This calibration is generally accomplished while the transducer 20 has an ambient temperature of room temperature, i.e., approximately 72° F. However, the temperature of the medium that communicates with the membrane on which the strain gages are mounted may be substantially different from room temperature or the temperature at which the sensor was calibrated. The strain gages, and particularly semiconductor strain gages, generally have a positive temperature coefficient so that an increased resistance in each leg of the bridge results from the increased temperature to which the gages are subjected. The increased resistance for a constant excitation current from source 26 will cause an increased output voltage, which output voltage will have a component due to the pressure sensed by the gages and a component due to the temperature sensed by the gages. However, the output should only have a component due to pressure and thus in accordance with this invention a temperature compensation circuit 30 is connected across the input terminals of the transducer 20. The temperature compensation circuit 30 includes an effective constant current source which presents a controllable current path which affects the magnitude of the excitation current flowing through the transducer 20. A shunt current $I_s$ flows through the current path of the temperature compensation circuit and an excitation current $I_r$ flows through the transducer 20. The temperature compensation circuit 30 includes an NPN transistor 31 having its collector connected to one input node of the bridge circuit of transducer 20 and its emitter connected through a variable resistor 32 to the other input node of the bridge circuit of transducer 20. The base of transistor 31 is connected through a resistor 33 to the source 26 and through a variable resistor 34 to the lower input node of the bridge circuit of transducer 20.

Resistors 33 and 34 form a voltage divider to provide bias to the transistor 31. The transistor circuit of the temperature compensation circuit 30 presents a relatively high impedance across the input nodes of the bridge circuit of transducer 20 and effectively functions like a constant current source with respect to the transducer 20. Now as the resistance of the transducer 20 increases with increase in ambient temperature, the increased sensitivity of the transducer 20 is compensated for by the temperature compensation circuit 30 which reduces the excitation current by shunting more current around the transducer 20. The reduction in excitation current correspondingly reduces the output of the transducer 20 to compensate for the change in ambient temperature.

The base to emitter junction of transistor 31 functions as a diode which is temperature sensitive so that the current flow through the transistor 31 is a function of temperature. Advantageously the temperature compensation circuit is designed so that the shunt current is a function of temperature and the absolute value of the change in excitation current is proportional to the absolute value in the change of shunt current. Thus the excitation current is made temperature dependent and the thermal function of the excitation current is the inverse of the thermal function of the strain gage bridge circuit of transducer 20. Thereafter the output voltage of the transducer 20 is pressure dependent only.

The transducer 20 will have a certain thermal sensitivity where the total resistance of the transducer 20 will change with a change in temperature. Assuming a positive temperature coefficient for the transducer 20, then the total resistance of the transducer 20 will increase with an increase in temperature. This thermal sensitivity will have a particular rate of increase which can be matched by an equal rate of decrease of resistance with respect to temperature through the transistor 31. As a consequence the shunt current will increase and the excitation current will decrease at the rate necessary to compensate for the increase in total resistance of the transducer 20. The thermal slope of the temperature compensation circuit may be adjusted if required to make it substantially the same as the thermal slope of the transducer 20. The thermal slope of the temperature compensation circuit 30 is adjusted by varying the resistance of the emitter resistor 32 in the shunt current path. Additionally the magnitude of the shunt current may be adjusted at a given temperature by varying the bias on the transistor 31. This may be advantageously varied by employing a variable resistor between the base and emitter of the transistor 31 such as resistor 34.

Figure 4:
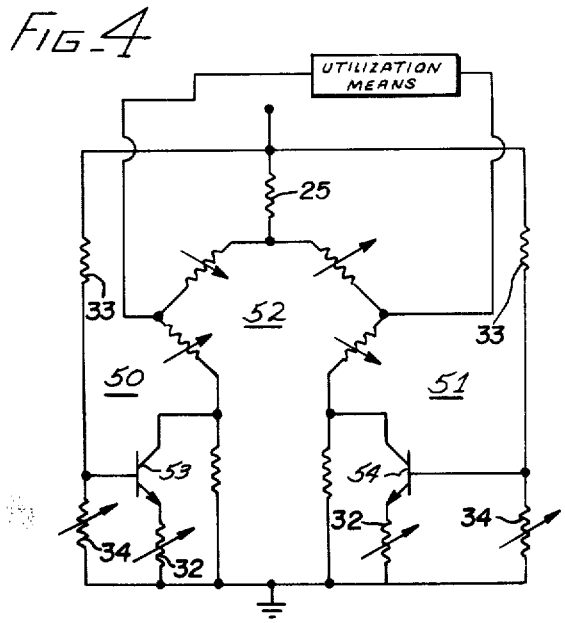
FIG. 4 is a schematic diagram of a pressure sensor having a particular temperature coefficient and compensated in accordance with the present invention.

Often times it is desirable to have the capability of compensating the individual legs of a transducer when it is comprised of a Wheatstone bridge circuit. Such a compensation circuit is shown schematically in FIGS. 4 and 5. In the circuit of FIG. 4 a transducer 40 is comprised of a Wheatstone bridge circuit including four strain gages 41 through 44 similar to the transducer 20 of FIG. 3. However, the bridge circuit of transducer 40 also includes a resistor 45 connected in one leg of the bridge circuit with strain gage 41 and a resistor 46 connected in another leg of the bridge circuit with strain gage 42.

The temperature compensation circuit includes two controllable shunt current paths respectively through a transistor 47 and a transistor 48. The shunt current paths of the temperature compensation circuit functions in the same way in the circuit of FIG. 4 as the shunt current path of temperature compensation circuit 30 does in the circuit of FIG. 3. However, the shunt current paths through transistors 47 and 48 may be adjusted individually to compensate for imbalalces in the legs of the bridge circuit of transducer 40. This correction is generally made when the sensor is calibrated at some selected temperature and is not readjusted thereafter. This calibration is generally accomplished at zero pressure so that the thermal compensation accompanied by adjusting the current paths through transistors 47 and 48 may be termed thermal zero compensation. The transistors 47 and 48 have the same cooperating resistive elements as the transistor 31 in the compensation circuit 30 of FIG. 3. Consequently, the same reference numbers are used for these resistors.

The temperature compensation circuit of the present invention may be connected in a transducer circuit to compensate for negative temperature coefficients as shown in FIG. 5. The temperature compensation circuits 50 and 51 are identical to the temperature compensation circuit 30 of FIG. 3 and operates in the same manner. However, the temperature compensation circuits 50 and 51 are connected in the excitation current paths of a transducer 52 to compensate for a negative temperature coefficient. With a negative temperature coefficient the total resistance of transducer 52 will decrease with an increase in temperature so that an increased excitation current is required to produce the same output with the resultant lower sensitivity. This increased current is provided by the effective constant current sources of the present invention. With an increase in temperature, the resistance of the current paths through the transistors 53 and 54 of the temperature compensation circuits 50 and 51 will decrease, thereby permitting an increase in excitation current and temperature compensation. Since the temperature compensation circuits 50 and 51 function the same as the circuit 30 in FIG. 3, the same reference numbers are used for corresponding elements.

Various changes may be made in the details of construction without departing from the spirit and scope of this invention as defined by the appended claims.

What is claimed is:

1. In combination:
   four pressure sensitive strain gages and two resistors connected in a Wheatstone bridge configuration having first and second input nodes and first and second output nodes, the bridge having an overall positive temperature coefficient so that the output voltage of the bridge when in use will increase wit an increase in the gage temperature;
   a first resistor connected in series with one of the gages between the first input node and the first output node;
   a second resistor connected in series with another of the gages between the first input node and the second output node.
   the first and second resistors being connected in common to the first input node;
   first circuit means connected between a first junction common to the first resistor and its associated gage in one leg of the bridge and the second input node for varying the excitation current to the gage connected to the first junction and the gage connected to that gage by causing less current to flow through the two gages when connected to a current source as the temperature of the gages increases above a selected point and by causing more current to flow through the two gages when connected to the current source as the temperature of the gages decreases below the selected point;
   the circuit means including an element in thermal proximity to the gages;
   second circuit means connected between a second junction common to the second resistor and its associate gage in another leg of the bridge circuit and the second input node for varying the excitation current to the gage connected to the second junction and the gage connected to that gage by causing less current to flow through the two gages when connected to the current source as the temperature of the gages increases above a selected point and by causing more current to flow between the two gages when connected to the current source as the temperature of the gages decreases below the selected point; and
   the second circuit means including an element in thermal proximity to the gages.

2. The combination in accordance with claim 1 wherein:
   the first circuit means is a first transistor circuit having its collector-emitter current path connected between the first junction associated with the first resistor and the second input node with the base-emitter junction of the first transistor circuit being in thermal proximity to the gages; and
   the second circuit means is a second transistor circuit having its collector-emitter current path connected between the second junction associated with the second resistor and the second input node with the base-emitter junction of the second transistor circuit being in thermal proximity to the gages.

3. The combination of claim 2 wherein each of the first transistor circuit and the second transistor circuit includes a variable resistor connected in the emitter current path for controlling the thermal slope of the associated transistor circuit.

4. The combination of claim 2 wherein each of the first transistor circuit and the second transistor circuit includes a biasing network of a fixed resistor and a variable resistor with the variable resistor being connected between the base and the emitter of the associated transistor circuit for controlling the thermal zero point of the gages.

5. In combination:
   four pressure sensistive strain gages and two resistors connected in a Wheatstone bridge configuration having first and second input nodes and first and second output nodes, the bridge having an overall negative temperature coefficient so that the output voltage of the bridge when in use will decrease with an increase in the temperature of the gage;
   a first resistor connected in series with one of the gages between the first input node and the second input node;
   a second resistor connected in series with another of the gages between the first input node and the second output node;
   the resistors being connected in common to the first input node;
   first circuit means connected between a first junction common to the first resistor and its associated gage in one leg of the bridge circuit and the first input node for varying the voltage drop across the gage connected to the first junction and the gage connected to that gage by causing a greater voltage drop across the two gages when in use as the temperature of the gages increases above a selected point and by causing a lesser voltage drop across the two gages when in use as the temperature of the gages decreases below the selected point;

the first circuit means including an element in thermal proximity to the two gages;

second circuit means connected between a second junction common to the second resistor and its associated gage in another leg of the bridge circuit and the first input node for varying the voltage drop across the gage connected to the second junction and the gage connected to that gage by causing a greater voltage drop across the two gages when in use as the temperature of the gages increases above a selected point and by causing a lesser voltage drop across the two gages when in use as the temperature of the gages decreases below the selected point; and the second circuit means including an element in thermal proximity to the gages.

6. The combination in accordance with claim 5 wherein:

the first circuit means is a transistor circuit having its collector-emitter current path connected between the first junction associated with the first resistor and the first input node with the base-emitter junction of the first transistor circuit being in thermal proximity to the gages; and the second circuit means is a second transistor circuit having its collector-emitter path connected between the second junction associated with the second resistor and the first input node with the base-emitter junction of the second transistor circuit being in thermal proximity to the gages.

7. The combination of claim 6 wherein each of the first transistor circuit and the second transistor circuit includes a variable resistor connected in the emitter current path for controlling the thermal slope of the associated transistor circuit.

8. The combination of claim 6 wherein each of the first transistor circuit and the second transistor circuit includes a biasing network of a fixed resistor and a variable resistor with the variable resistor being connected between the base and the emitter of the associated transistor circuit for controlling the thermal zero point of the gages.

9. In combination:

at least one pressure sensitive strain gage having an output voltage that increases with an increase in the gage temperature;

a source of excitation current;

transistor circuit means, having its collector-emitter current path connected in parallel with the gage as seen by the source of excitation current for drawing more current from the source through the circuit means and causing less current to flow through the gage as the temperature of the gage increases above a selected point, and for drawing less current from the source through the circuit means and causing more current to flow through the gage as the temperature of the gage decreases below the selected point;

a variable resistor connected in the emitter current path for controlling the thermal slope of the transistor circuit; and the base-emitter junction of the transistor circuit being in thermal proximity to the gage.

10. In combination:

at least one pressure sensitive strain gage having an output voltage that increases with an increase in the gage temperature;

a source of excitation current;

transistor circuit means having its collector-emitter current path connected in parallel with the gage as seen by the source of excitation current for drawing more current from the source through the circuit means and causing less current to flow through the gage as the temperature of the gage increases above a selected point and for drawing less current from the source through the circuit means and causing more current to flow through the gage as the temperature of the gage decreases below the selected point;

a biasing network of a fixed resistor and a variable resistor being connected between the base and emitter of the transistor circuit for controlling the thermal zero point of the gage; and the base-emitter junction of the transistor circuit being in thermal proximity to the gage.

11. In combination:

a Wheatstone bridge having four legs innerconnected to define first and second input nodes and first and second output nodes, the bridge being operable to accept an excitation signal on the first and second input nodes and to provide an output signal on the first and second output nodes;

strain gage means included in a particular one of the legs defining the first input node and providing the bridge with an overall temperature coefficient such that the output signal on the first and second output nodes tends to vary in response to variations in the temperature of the strain gage means;

resistance means included in the particular leg of the bridge and connected through a common terminal to the strain gage means; and correction circuit means disposed in thermal proximity to the strain gage means and coupled between the common terminal and one of the first input node and the second input node of the bridge, the correction circuit means having properties for varying the excitation signal through the strain gage means as the temperature of the strain gage means varies about a predetermined temperature to correct for the overall temperature coefficient of the bridge.

12. The combination recited in claim 11 wherein the strain gage means provides the bridge with an overall positive temperature coefficient such that the output signal on the first and second output nodes tends to increase with an increase in the temperature of the strain gage means and the correction circuit means is coupled between the common terminal and the second input node of the bridge for varying the excitation signal through the strain gage means as the temperature of the strain gage means varies about the predetermined temperature to correct for the overall positive temperature coefficient of the bridge.

13. The combination recited in claim 11, wherein the strain gage means provides the bridge with an overall negative temperature coefficient such that the output signal on the first and second output nodes tends to decrease with a decrease in the temperature of the strain gage means, and the correction circuit means is coupled between the common terminal and the first input node of the bridge for varying the excitation signal through the strain gage means as the temperature of the strain gage means varies about the predetermined temperature to correct for the overall negative temperature coefficient of the bridge.

14. The combination recited in claim 11 wherein the strain gage means has a thermal zero point and the correction circuit means is a transistor circuit including a biasing network of a fixed resistor and a variable resistor with the variable resistor being connected between the base and the emitter of the transistor circuit for controlling the thermal zone point of the strain gage means.

15. The combination set forth in claim 11 wherein the correction circuit means includes a transistor circuit having a collector-emitter current path connected between the common terminal and the one input node with at least the base-emitter junction of the transistor circuit being in thermal proximity to the strain gage means.

16. The combination recited in claim 15 wherein the transistor circuit has a thermal slope and includes resistance means connected in the collector-emitter current path for controlling the thermal slope of the transistor circuit.

17. In combination:
a Wheatstone bridge having four legs interconnected to define first and second input nodes and first and second output nodes, each of the legs being connected between an associate one of the input nodes and an associate one of the output nodes;
strain gage means included in a particular one of the legs of the bridge and providing the bridge with an overall temperature coefficient such that the output signal on the first and second output nodes tends to vary with variations in the temperature of the strain gage means;
a resistance means included in the particular leg of the bridge and being connected between a particular terminal in the particular leg and the first input node; and
correction circuit means connected between the particular terminal in the particular leg and a particular one of the first and second input nodes for correcting the temperature coefficient of the bridge.

18. The combination set forth in claim 17 wherein the correction circuit means is connected between the particular terminal and the first input node in substantially parallel relationship with the resistance means.

19. The combination recited in claim 17 wherein the correction circuit means is connected between the particular terminal and the second input node in substantially parallel relationship with the strain gage means.

20. The combination recited in claim 19 wherein the transistor circuit has a thermal slope and further comprises a variable resistor disposed in the emitter current path of the transistor circuit for controlling the thermal slope of the transistor circuit.

21. The combination recited in claim 17 wherein the correction circuit means includes a transistor circuit having its collector-emitter current path connected between the particular terminal in the particular leg and the particular input node of the brodge.

22. The combination recited in claim 21 wherein the gage means include a thermal zero point and the transistor circuit includes a biasing network of a fixed resistor and a variable resistor with the variable resistor being connected between the base and the emitter of the transistor circuit for controlling the thermal zero point of the strain gage means.

23. A temperature compensation circuit adapted to be coupled to a power source and a Wheatstone bridge having four legs interconnected to define first and second input nodes and first and second output nodes, and strain gage means including a strain gage disposed in each of the four legs of the bridge for measuring temperature and for providing on the first and second output nodes an electrical output signal having characteristics dependent upon the measured temperature, the strain gage means having properties providing the bridge with a thermal zero point, the temperature compensation circuit including:
a particular resistor connected between the power source and a terminal common to an associated one of the strain gages;
a transistor circuit including a transistor having its collector-emitter current path connected between the common terminal and a particular one of the first and second input nodes; and
resistance means disposed in the transistor circuit and including a fixed resistor coupled to the power source and a variable resistor, the variable resistor being connected between the base of the transistor and the particular input node for varying the thermal zero point of the bridge.

24. The temperature compensation circuit recited in claim 23 wherein the particular resistor is disposed in one of the legs of the bridge and is connected to the power source as the first input node and to the associated strain gage at the common terminal.

25. The temperature compensation circuit recited in claim 23 wherein the first input node of the bridge is the common terminal and the particular resistor is connected between the power source and the bridge.

26. A temperature compensation circuit adapted to be coupled to a power source and a Wheatstone bridge having four legs connected to define first and second input nodes and first and second output nodes, and strain gage means including a strain gage disposed in each of the four legs of the bridge for measuring temperature and providing on the first and second output nodes an electrical output signal having characteristics dependent upon the measured temperature, the strain gage means having properties providing the bridge with a thermal zone point, the compensation circuit including:
a particular resistor connected between the power source and a terminal common to an associated one of the strain gages;
a transistor disposed with its collector-emitter junction connected between the common terminal and one of the first and second input nodes; and
resistance means including a fixed resistor and a variable resistor, the variable resistor being connected between the base of the transistor and a particular one of the first and second input nodes to vary the thermal zero point of the bridge.

27. The temperature compensation circuit recited in claim 26 wherein the resistance means is a first resistance means and the transitor has properties including a thermal slope, the circuit further comprising second resistance means including a variable resistor disposed between the collector-emitter junction of the transistor and the particular input node for controlling the thermal slope of the transistor.

* * * * *